Jan. 26, 1960 O. K. NILSSEN 2,922,962
DISTRIBUTION NETWORK
Filed Dec. 27, 1956
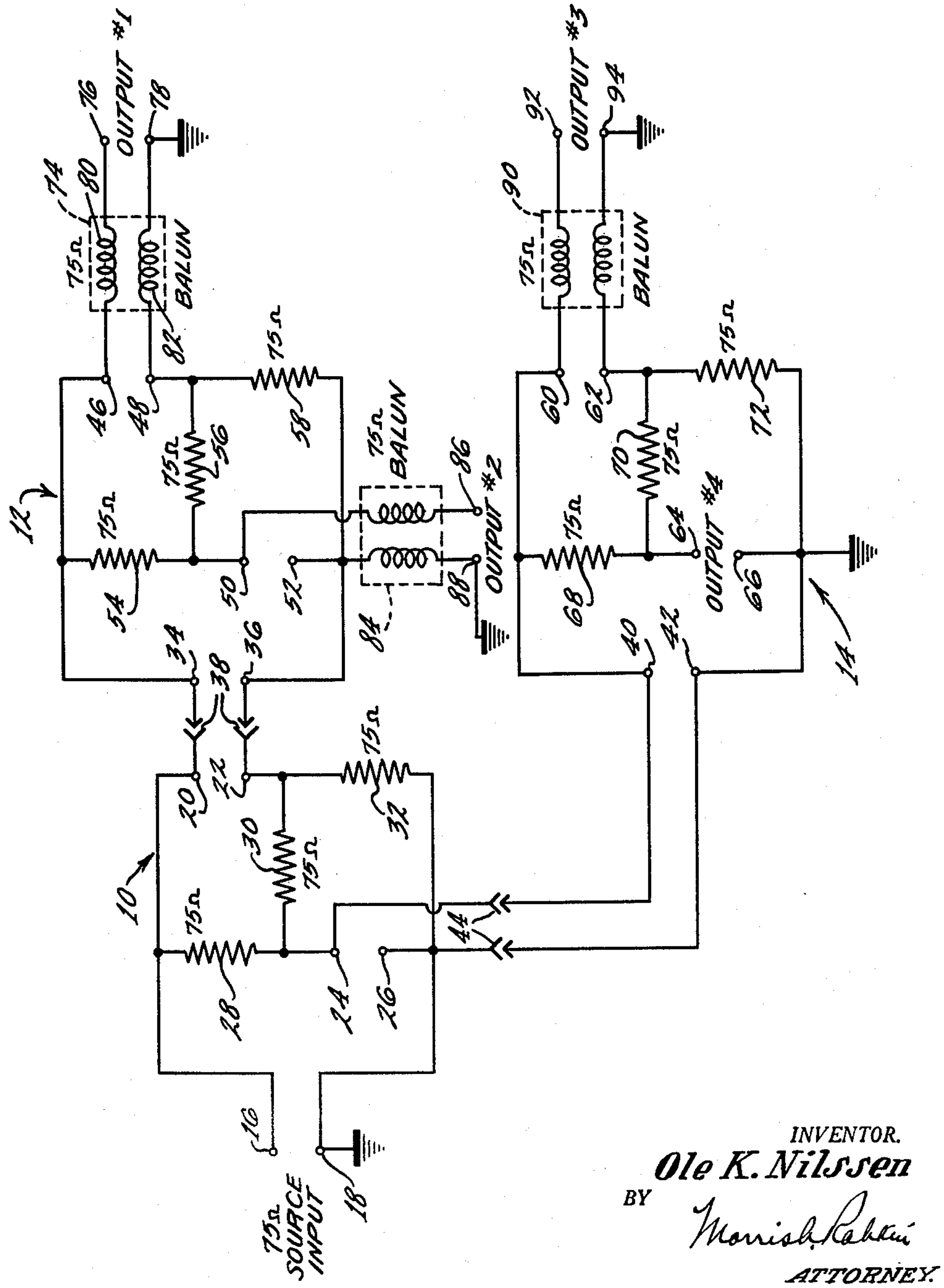
INVENTOR.
Ole K. Nilssen
BY
ATTORNEY.

United States Patent Office 2,922,962

Patented Jan. 26, 1960

2,922,962

DISTRIBUTION NETWORK

Ole K. Nilssen, Inkster, Mich., assignor to Radio Corporation of America, a corporation of Delaware Application December 27, 1956, Serial No. 630,990

2 Claims. (Cl. 333—8)

This invention relates to distribution networks, and particularly to an improved distribution network presenting a low insertion loss to input signals and a high degree of isolation among a plurality of outputs.

It is often desirable to distribute electrical energy, such as television signals, from a single source of energy to a plurality of similar loads. Distribution networks have been proposed, for example, to distribute television signals from a single transmission line to a plurality of television receivers. In most of these distribution networks, however, there is an interaction between the outputs, as when one of the loads is removed, shorted, or changed in impedance value. In other words, a change in the impedance of one of the loads will usually cause standing waves to form in the distribution network. The standing waves will, in turn, cause the other outputs to be affected. Also, spurious signals produced by one receiver may be fed back through the distribution network and interfere with the other receivers. It has been proposed to isolate the outputs of prior art distribution networks by 20 db pads but, in so doing, the insertion loss in the network is relatively increased.

Accordingly, it is an object of the present invention to provide an improved distribution network that presents a relatively low insertion loss to input signals, and provides theoretically complete isolation among a plurality of outputs.

Another object of the present invention is to provide an improved distribution network wherein input signals may be divided equally between two outputs, and wherein one output is not affected, regardless of the impedance with which the other output is terminated.

A further object of the present invention is to provide an improved distribution network wherein input signals may be equally divided among four outputs, with a relatively low insertion loss, and wherein the load impedance at any one output will not be affected by any change in the load impedance at any of the other three outputs.

Still a further object of the present invention is to provide an improved distribution network that is simple in construction, easy to operate, and highly efficient in use.

These objects and related advantages of the present invention are attained in an improved distribution network comprising, in its simplest form, a bridge network having a pair of input terminals and two outputs defined by two pairs of output terminals. Three equal impedance elements are connected in series with each other and between the input terminals. The first pair of output terminals is connected in series with two of the impedance elements, and the second pair of output terminals is connected in series with one of the two impedance elements and the third impedance element. Regardless of the termination impedance connected to any one pair of the two pairs of output terminals, the output impedance across the other pair of output terminals will remain unchanged. Thus, isolation between the two outputs is achieved. In its more complex form, the distribution network of the present invention comprises a plurality of the aforementioned bridge networks. For example, a single input may be divided equally among four outputs with theoretically complete isolation among the outputs, and with a low insertion loss. When, for example, three bridge networks are employed, the distribution network comprises connections between the input terminals of a second bridge network and one pair of output terminals of a first bridge network, and connections between the input terminals of a third bridge network and the second pair of output terminals of the first bridge network. Thus, input signals to the first bridge network may be divided evenly, and will be, theoretically, isolated from signals at the output terminals of the second and third bridge networks.

The novel features of the present invention, as well as the invention itself, both as to its organization and method of operation will be understood in detail from the following description when considered in connection with the accompanying drawing, the single figure of which is a schematic diagram of a distribution network in accordance with the present invention.

Referring, now, to the drawing, there is shown a distribution network, in accordance with the present invention, comprising a plurality of bridge networks 10, 12, and 14. The bridge network 10 comprises a pair of input terminals 16 and 18, a first pair of output terminals 20 and 22, and a second pair of output terminals 24 and 26. Three similar impedance elements 28, 30, and 32, such as three resistors of equal resistance, are connected in series with each other and between the input terminals 16 and 18. The first two impedance elements 28 and 30 are connected in series with the first pair of output terminals 20 and 22, and one of the first two impedance elements 30 and the third impedance element 32 are connected in series with the second pair of output terminals 24 and 26.

The distribution network, in its simplest form, in accordance with the present invention, comprises the bridge network 10. The characteristic impedance of a source of signals, as from a transmission line (not shown), presented to the input terminals 16 and 18 should be equal to the impedance of one of the impedance elements, for example, impedance element 28. Each of the loads (not shown) applied between the output terminals 20 and 22, and 24 and 26, respectively, should present an impedance equal to the impedance of one of the impedance elements also. Under these conditions, the bridge circuit 10 will be a matched distribution network presenting a low insertion loss and complete isolation between the first and second outputs. For example, changing the output impedance of a load connected between the output terminals 20 and 22 from a complete short to an infinite resistance will have no effect upon a load connected between the output terminals 24 and 26. Thus, if the characteristic impedance presented to the input terminals 16 and 18 is 75 ohms, and the impedance of each of the impedance elements 28, 30, and 32 is 75 ohms, as illustrated, a load (not shown) between the output terminals 24 and 26 will see an impedance of 75 ohms regardless of the impedance of the load (not shown) applied to the output terminals 20 and 22.

Where a number of outputs, greater than two, is desired, one or more bridge networks each similar to the bridge network 10, may be connected as loads on the first and/or second outputs of the bridge network 10. Thus, a pair of input terminals 34 and 36 of the bridge network 12 is connected to the output terminals 20 and 22 of the bridge network 10, through a pair of electrical connectors 38. In a similar manner, the input terminals 40 and 42 of the bridge network 14 are connected to the second pair of output terminals 24 and 26 of the bridge network 10, through a pair of connectors 44. The bridge network 12 comprises a first pair of output terminals 46 and 48, a second pair of output terminals 50 and 52, and three equal impedance elements 54, 56, and 58, all connected in a manner similar to that described for the bridge network 10. The bridge network 14 also comprises a first pair of output terminals 60 and 62, a second pair of output terminals 64 and 66, and three equal impedance elements 68, 70, and 72, all connected in a manner similar to that described for the bridge network 10.

It will now be understood that the distribution network, comprising the bridge networks 10, 12, and 14, comprises means for distributing input signals, applied to the input terminals 16 and 18, equally to a first output between the output terminals 46 and 48; to a second output between the output terminals 50 and 52; to a third output between the terminals 60 and 62; and to a fourth output between the output terminals 64 and 66. With this arrangement 100 percent isolation is theoretically achieved among the four outputs. Thus, if four loads (not shown) each of an impedance equal to one of the impedance elements such as the impedance element 54, were applied between the output terminals 46 and 58, 50 and 54, 60 and 62, and 64 and 66, it will be seen that any change in impedance of the loads at any three of the output terminals will not affect the output impedance into which the fourth looks. The insertion loss of this circuit is only 6 db which is considerably less than the usual 20 db pads needed to produce isolation in prior art distribution networks.

Where a source of signals is presented to the input terminals 16 and 18 through a coaxial cable (not shown) the outer conductor may be grounded, as indicated by the ground connected to the input terminal 18. This ground may also represent a common connection. If it is desired to refer all output terminals to a common connection, such as ground, baluns may be connected to the output terminals, where needed. For example, a balun 74, may have its input terminals connected to the output terminals 46 and 48 of the bridge network 12. The output terminals 76 and 78 of the balun 74 now represent the first output of the bridge network 12, or of the distribution network comprising the bridge networks 10, 12, and 14. The output terminal 78 of the balun 74 may be connected to the common terminal ground.

The balun 74, well known in the art, may comprise two bifilar windings 80 and 82 for providing a relatively low impedance to balanced (push-pull) currents, and a relatively high impedance to unbalanced (push-push) currents. The impedance of the balun 74 should be equal to the impedance of one of the impedance elements, such as the impedance element 54, which should also be equal to the impedance of the signal source at the input terminals 16 and 18. A distribution network suitable for television signals could have impedance elements of 75 ohms each, as illustrated. A balun 84, similar to the balun 74, has its input terminals connected to the output terminals 50 and 52 of the bridge network 12. The output terminals 86 and 88 of the balun 84 now comprise the second output of the distribution network. The output terminal 88 may be connected to the common connection, ground. In a similar manner, a balun 90 has its input terminals connected to the output terminals 60 and 62 of the bridge network 14. The output terminals 92 and 94 of the balun 90 now comprise a third output of the distribution network. The terminal 94 may be connected to the common connection, ground. A balun is not necessary at the fourth output, defined by the output terminals 64 and 66, because the output terminal 66 is connected to the input terminal 18, which is already connected to the common terminal, ground.

Thus, there has been shown and described, in accordance with the objects of the present invention, a distribution network wherein a source of input signals applied to a single input may be distributed equally among a plurality of outputs. The impedance presented by the distribution network to a load connected to any one output is unaffected by any change in the impedance at any of the other loads if the impedance of the input is equal to the impedance of one of the three equal impedance elements in each bridge network. Where it is desirable to refer each output to a common connection, the input terminals of a balun are connected to an output terminal of the network, where necessary, and the output terminals of the balun will represent an output of the bridge network which may be referred to the common connection, ground.

What is claimed is:

1. A distribution network consisting of a bridge network having first, second, third, and fourth corners arranged in that order in one direction around said bridge network, means coupled to said first and said third corners for applying an input signal thereto from a source having a predetermined magnitude of impedance, a first impedance element having said predetermined magnitude of impedance coupled between said second and said fourth corners, first output means coupled to said first and said second corners for deriving a first output signal therefrom, second output means coupled to said third and said fourth corners for deriving a second output signal therefrom, a second impedance element having said predetermined magnitude of impedance coupled between said second and said third corners, and a third impedance element having said predetermined magnitude of impedance coupled between said first and said fourth corners.

2. A distribution network consisting of a bridge network having first, second, third, and fourth corners arranged in that order in one direction around said network, means coupled to said first and said third corners for applying an input signal thereto from a source having a predetermined magnitude of impedance, a first resistor having said predetermined magnitude of impedance coupled between said second and said fourth corners, first output means coupled to said first and said second corners for deriving a first output signal therefrom, second output means coupled to said third and said fourth corners for deriving a second output signal therefrom, a second resistor having said predetermined magnitude of impedance coupled between said second and said third corners, and a third resistor having said predetermined magnitude of impedance coupled between said first and said fourth corners.

References Cited in the file of this patent

UNITED STATES PATENTS

| | | |
|---|---|---|
| 2,115,059 | Blumlein | Apr. 26, 1938 |
| 2,509,651 | Olson | May 30, 1950 |
| 2,882,339 | Smee | Apr. 14, 1959 |

OTHER REFERENCES

Publication: TV Master Antenna Systems, by Kamen and Dorf, 1951,

John F. Rider, Inc., New York, N.Y., page 90 relied on.